: 3,301,833
OLEFIN COPOLYMERS AND PROCESS FOR PREPARING THEM

Giulio Natta, Giorgio Mazzanti, Alberto Valvassori, Guido Sartori, and Vittorio Turba, all of Milan, Italy, assignors to Montecatini Edison S.p.A., Milan, Italy
No Drawing. Filed July 12, 1963, Ser. No. 294,752
Claims priority, application Italy, July 13, 1962, 14,103/62
15 Claims. (Cl. 260—80.5)

This invention relates to vulcanizable, substantially linear, amorphous, high molecular weight copolymers of one or more polycylic polyenes having isolated nuclei, with one or more monomers selected from ethylene and aliphatic alpha-olefins having the general formula $$R—CH=CH_2$$

in which R is an alkyl group containing 1 to 6 carbon atoms.

More particularly this invention relates to high molecular weight, substantially linear, amorphous copolymers of the aforementioned monomers, containing in each macromolecule, monomeric units derived from each of the monomers utilized.

By "substantially linear" copolymers it is meant such copolymers free of, or containing very few long branches, which exhibit properties such as a viscous behavior, practically identical with those of a linear copolymer, e.g., an ethylene-alpha-olefin linear copolymer.

This invention also relates to a process for preparing the said copolymers by utilizing particular catalysts acting with an anionic co-ordinated type mechanism.

The preparation of amorphous unsaturated copolymers has already been described in prior patents. More particularly, Italian Patents 566,913 and 638,953, and Belgian Patents 623,698 and 623,741 have described the preparation of amorphous copolymers of ethylene and/or aliphatic alpha-olefins with either conjugated or non-conjugated, linear or cyclic dienes.

The cyclic polyenes heretofore utilized in the preparation of unsaturated copolymers, have all had all the unsaturations in the same ring.

The possibility of utilizing dienes or polyenes containing the unsaturations in different rings, not condensed with each other, has heretofore not been foreseen, since the use of this type of polyene was an unobvious and unusual possibility because of the very low reactivity of the inner olefinic double bonds.

It could, therefore, not be foreseen that these polyenes could be copolymerized with ethylene and/or alpha-olefins and thereby could be introduced in appreciable amounts into the copolymer chain. Moreover, it was heretofore thought that the presence of more nuclei could exert a steric hindrance, thus completely annulling the already poor reactivity of the double bonds contained in the rings of the polyene.

It has now surprisingly been found, according to the present invention, that by utilizing particular catalysts acting with an anionic co-ordinated mechanism, and more particularly catalysts prepared from vanadium compounds and metallorganic or hydride aluminum compounds, it is possible to obtain high molecular weight linear amorphous copolymers of polycyclic dienes or polyenes having isolated nuclei and containing unsaturations in different nuclei, with one or more monomers selected from ethylene and aliphatic alpha-olefins having the general formula $R—CH=CH_2$, in which R is an alkyl group containing 1 to 6 carbon atoms, said copolymers being composed of macromolecules containing unsaturations and comprising monomeric units derived from each of the monomers utilized.

Since the olefins containing inner double bonds cannot momopolymerize, the monomeric units of polycyclic polyene will never be directly enchained with each other but will rather be well distributed in the polymeric chain. The unsaturations therefore will also be well distributed along the macromolecule chain.

The following polycyclic polyenes having isolated nuclei are mentioned as non-restrictive examples of polyenes which can be utilized to advantage according to the teachings of this invention: $\Delta 2,2'$-dicyclopentenyl, $\Delta 2,2'$-dicyclohexenyl, $\Delta 3,3'$-dicyclohexenyl, dicyclo-octenyl, 2,2'-bis (cyclohexen-3-yl)-propane, 1,4-bis(cyclopenten-2-yl) butane, 1,5-bis(cyclopenten-2-yl) pentane.

The olefins which can be utilized with polycyclic polyenes and, if desired, together with ethylene and polycyclic polyenes in the preparation of the copolymers, are alpha-olefins having the general formula $RCH=CH_2$ in which R is an alkyl group containing 1 to 6 carbon atoms, and more particularly propylene and butene-1.

By copolymerizing according to the present invention a mixture of the aforementioned monomers (such as e.g., a mixture of ethylene, propylene and/or butene-1 and $\Delta 2,2'$-dicyclopentenyl), a crude copolymerization product is obtained which consists of macromolecules each containing monomeric units of ethylene, propylene and/or butene-1 and dicyclopentenyl distributed at random. However, two consecutive dicyclopentenyl units are never present along the macromolecule.

Each monomeric unit derived from the polymerization of the polycyclic diene or polyene having isolated nuclei, still contains one or, respectively, more free unsaturations. In fact, infrared spectrographic examination shows the presence of unsaturations (band at 6 microns).

These unsaturations are reactive points for successive reactions on the copolymer. They allow e.g., the vulcanization of the copolymer by using sulfur-containing mixes such as those commonly used to vulcanize low unsaturation rubber.

The double bond present in the macromolecule can also, e.g., by oxidation with ozone, lead to the formation of polar groups, such as e.g., carboxylic groups, which in turn represent reactive groups for successive reactions (e.g., vulcanization), or these reactive groups can be utilized for improving the adhesion of the polymer.

These double bonds present in the polymeric chains can also be used in addition reactions with metal hydrides, e.g., $LiH$, $NaBH_4$, $AlH(C_4H_9)_2$, etc. The metal-to-carbon bonds thus formed can be used for further reactions.

The copolymers of this invention have a molecular weight, determined viscosimetrically, higher than 20,000. This corresponds to an intrinsic viscosity, determined in toluene at 30° C. or in tetrahydronaphthalene at 135° C., higher than 0.05. The intrinsic viscosity of the copolymers may range from 0.5 to 10 or above. Copolymers having an intrinsic viscosity of from 1 and 5, however, are generally preferred.

The homogeneity of these copolymers is confirmed by the easy obtainment (e.g. in case of an ethylene-propylene $\Delta 2,2'$-dicyclopentenyl terpolymer) of good vulcanized products by adopting the techniques normally utilized for the vulcanization of unsaturated rubbers, preferably of those rubbers which have a low unsaturation content, such as butyl rubber. This shows that the unsaturations are very well distributed in the macromolecular chains.

The vulcanized products thus obtained, as distinguished from the non-vulcanized polymers which are completely soluble in boiling n-heptane, are completely insoluble in organic solvents such as aliphatic hydrocarbons and are swollen only to a limited extent by some aromatic solvents. The vulcanized products also have very good mechanical strength and a low permanent set after breaking.

The catalytic systems which can be utilized in the preparation of the copolymers according to this invention are highly dispersed or amorphous colloidally dispersed or completely dissolved in the hydrocarbons which can be used as copolymerization media, e.g., aliphatic, cycloaliphatic and aromatic hydrocarbons and are prepared from metallorganic or hydride aluminum compounds and vanadium compounds.

The class of metallorganic or hydride aluminum compounds which can be employed according to the present invention in the preparation of the catalyst comprises: aluminum trialkyls, aluminum dialkyl monohalides, aluminum monoalkyl dihalides, aluminum alkenyls, aluminum alkylenes, aluminum cycloalkyls, aluminum cycloalkylalkyls, aluminum aryls, aluminum alkyl aryls, aluminum alkylhydrides, aluminum halohydrides, aluminum dialkylalcoxides, aluminum alkylacoxyhalides, or complexes of the aforementioned organic aluminum compounds with preferably weak Lewis bases.

As non-limitative examples of metallorganic or hydride compounds which can be utilized in the preparation of the catalysts of this invention can be mentioned: aluminum triethyl, aluminum triisobutyl, aluminum trihexyl, aluminum diethyl monochloride, aluminum diethyl monoiodide, aluminum diethyl monofluoride, aluminum diisobutyl monochloride, aluminum monoethyl dichloride, aluminum isohexenyl diethyl, 2-methyl-1,4-di(diisobutylaluminum) butane, aluminum tri-(cyclomethylpentyl), aluminum tri-(dimethylcyclopentyl), aluminum triphenyl, aluminum tritolyl, aluminum di(cyclopentylmethyl) monochloride, aluminum diphenyl monochloride, aluminum diisobutyl monochloride, complexed with anisole, aluminum diethylmonohydride, aluminum diisobutylmonohydride, aluminum monoethyldihydride, aluminum chlorohydride, aluminum monochloromonoethylmonoethoxide, aluminum diethylpropoxide, aluminum diethylamiloxide, aluminum monochloromonopropylmonopropoxide, aluminum monochloromonopropylmonoethoxide.

In order to obtain a more restricted distribution of molecular weights, vanadium compounds soluble in the hydrocarbon, utilized as the copolymerization medium, are preferably employed in the preparation of the catalyst.

We, therefore, use vanadium halides and oxyhalides (such as $VCl_4$, $VOCl_3$, $VBr_4$) and compounds in which at least one of the metal valences is saturated by a heteroatom (more particularly oxygen or nitrogen) bound to an organic group, such as e.g., vanadium triacetylacetonate, vanadium tribenzoylacetonate, vanadyl diacetyl acetonate, vanadyl halo(acetylacetonates) trialkoxides and vanadyl halo-alkoxides, tetrahydrofuranates, etherates, aminates, pyridinates and quinolinates of vanadium tri- and tetrachloride and of vanadyl trichloride.

Hydrocarbon-insoluble vanadium compounds selected from the organic salts, such as e.g., vanadium triacetate, vanadium tristearate and vanadium tribenzoate, can also be utilized.

In practice it has been found that in order to obtain the best results, it is necessary to operate the process in the presence of a halogen containing catalyst system obtained from vanadium compounds and aluminum organic or hydride compounds wherein at least one of the valences of the vanadium and/or of the aluminum is saturated by a halogen atom.

Thus, while in case of halogen containing vanadium compounds all the aforementioned aluminum compounds can be used in the preparation of the catalyst, in the case of halogen-free vanadium compounds it has been found that in order to obtain the best results it is necessary to use halogen-containing aluminum compounds.

Specific examples of catalyst systems which can be used in the preparation of the copolymers of the present invention are: vanadium tetrachloride/aluminum trihexyl, vanadium tetrachloride/aluminum diethylmonochloride, vanadyl - chloro - acetylacetonate/aluminum diethyl monochloride, vanadyl chloroacetylacetonate/aluminum triethyl, vanadium trichloride tripyridinate/aluminum diisobutyl monochloride, vanadyl trichloride/2 - methyl-1,4 - di(diisobutylaluminum) butane, vanadyl tri n-butylate/aluminum diisobutylmonochloride, vanadium trichloride tetrahydrofuranate/aluminum diphenylmonochloride, vanadium tristearate/aluminum diisobutylmonochloride, vanadium tetrachloride/aluminum diisobutylhydride and the like.

The copolymerization process according to the present invention can be carried out at temperatures comprised between −80° and 125° C.

In case catalysts prepared from vanadium triacetylacetonate, vanadyl halo - acetylacetonates, vanadyl diacetyl acetonate or in general from a vanadium compound in the presence of aluminum alkyl halides are used, both the preparation of the catalyst and the polymerization should conveniently be carried out at temperatures comprised between 0° and −80° C., preferably between −10° and −50° C. in order to obtain high productions of copolymer per unit weight of catalyst utilized.

By operating under these conditions the catalysts show a much higher activity than that of the same catalytic systems prepared at higher temperatures. Moreover by operating in the range of the aforementioned low temperatures, the activity of the catalyst remains practically unaltered in time.

If catalysts prepared from vanadium triacetylacetonate, vanadyl trialkoxides or vanadyl halo-alkoxides and an aluminum alkyl halide, at temperatures comprised between 0° C. and 125° C. are used, it is convenient to operate in the presence of particular complexing agents selected from ethers, thioethers, tertiary amines or trisubstituted phosphines containing at least one branched alkyl group or an aromatic nucleus, in order to obtain high productions of copolymer.

The complexing agent may be an ether of the formula RYR', wherein Y is oxygen or sulfur and R and R' represent a linear or branched alkyl group containing from 1 to 14 carbon atoms or an aromatic uncleus containing from 6 to 14 carbon atoms, at least one of the R and R' being a branched alkyl group or an aromatic nucleus.

The complexing agent may also be a tertiary amine of the formula

wherein R, R' and R'' represent an alkyl group containing from 1 to 14 carbon atoms or an aromatic nucleus containing from 6 to 14 carbon atoms at least one of the R, R' and R'' being an aromatic nucleus.

The complexing agent may also be a tertiary phosphine of the formula

wherein R, R' and R'' represent an alkyl group containing from 1 to 14 carbon atoms or an aromatic nucleus containing from 6 to 14 carbon atoms at least one of the R, R' and R'' being an aromatic nucleus.

The amount of complexing agent is preferably comprised between 0.05 to 1 mole per mole of aluminum alkyl halide.

The activity of the catalysts utilized in the process described herein vary by varying the molar ratio between the compounds utilized in the preparation of the catalyst.

According to the present invention it has been found that by using, e.g., aluminum trialkyls and vanadium halides or oxyhalides it is convenient to use catalysts in which the molar ratio of aluminum trialkyl to vanadium compound is comprised between 1:1 and 5:1, and preferably between 2:1 and 4:1.

Conversely, by using aluminum diethyl monochloride (Al(C₂H₅)₂Cl) and vanadium triacetylacetonate (VAc₃) the best results are obtained with an Al(C₂H₅)₂Cl/Ac₃ molar ratio between 2:1 and 20:1 preferably between 4:1 and 10:1.

The copolymerization of the present invention can be carried out in the presence of an aliphatic, cycloaliphatic, and aromatic hydrocarbon solvents, such as e.g., butane, pentane, n-heptane, cyclohexane, toluene, xylene or their mixtures.

Halogenated hydrocarbons, such as e.g., chloroform, trichloroethylene, tetrachloroethylene, chlorobenzene, methylene chloride etc. can also be used as solvents.

Particularly high copolymer productions can be obtained if the copolymerization is carried out in the absence of an extraneous solvent, by using the monomers in the liquid state, namely, e.g. in the presence of a solution of ethylene in the mixture of alpha-olefins and of polycyclic diene or polyene having isolated nuclei to be copolymerized, kept in the liquid state.

In order to obtain copolymers having a highly homogeneous composition the ratio between the concentrations of the monomers to be copolymerized, present in the liquid reacting phase, should be kept constant or at least as constant as possible during the copolymerization. For this purpose it can be convenient to carry out the copolymerization continuously by periodically or continuously adding the catalyst components to the system and by continuously charging and discharging a mixture of monomers having a constant composition and by operating with high spacial rates.

By varying the composition of the mixture of monomers the composition of the copolymers can be varied within wide limits. In case of copolymers of ethylene with a polycyclic diene or polyene with isolated nuclei such as, e.g. Δ2,2'-dicyclopentenyl it is necessary to regulate the monomer mixture so as to obtain copolymers having a relatively high diene content, preferably higher than 20% in order to obtain amorphous materials having elastomeric properties.

If amorphous copolymers of a polycyclic diene or polyene with isolated nuclei with ethylene and propylene is desired, a molar ratio of ethylene to propylene lower than or at most equal to 1:4 should be kept in the liquid phase. This corresponds to an ethylene/propylene molar ratio in the gaseous phase, under standard conditions of lower than or at most equal to 1:1, with ratios of between 1:200 and 1:4 in the liquid phase being satisfactory. If butene-1 is used instead of propylene, the ethylene/butene molar ratio should be lower than or at most equal to 1:20. The composition of the corresponding gaseous phase, under standard conditions, is lower than or at most equal to 1:1.5. Molar ratios of from 1:1000 and 1:20 are usually preferred.

By operating under these conditions amorphorus terpolymers containing less than about 75% by moles of ethylene are obtained. If the terpolymers contain more than about 75% by moles of ethylene they show a polyethylene type crystallinity. The lower ethylene content is not critical, it is however preferred that the terpolymers contain at least 5% by moles of ethylene.

The α-olefin content may preferably vary from 5% up to 95% by moles.

The polyene content in the terpolymer is preferably comprised between 0.1 and 20% by moles. This limit can however be raised but it is in general convenient, especially for economical reasons, to introduce into the copolymer a polyene content lower than 20% by moles.

If amorphous binary copolymers of ethylene and a polyene are to be obtained they must contain at least 25% by moles of the polyene.

The copolymers of this invention, as they are, show the properties of non-vulcanized elastomers since they have a low initial modulus of elasticity and very high elongation at break.

Due to the presence of unsaturations in the macromolecules forming these copolymers, they can be vulcanized with the methods normally utilized for vulcanizing unsaturated rubbers, and more particularly for rubbers having a low unsaturation content. The vulcanized products show high reversible elastic elongation and, in particular, when reinforcing fillers such as carbon black are used in the mix, they also have a high tensile strength.

The elastomers obtained by vulcanization of the copolymers according to the present invention can be used advantageously, due to their high mechanical characteristics, in the preparation of various articles, such as e.g., shaped articles, tubes, air tubes, elastic yarns, etc.

The following examples further illustrate the invention and are not intended to limit its scope.

*Example 1*

The reaction apparatus consists of a glass cylinder having a diameter of 5.5 cm. and a capacity of 750 cc., provided with an agitator and gas inlet and outlet tubes, immersed in a thermostatic bath kept at −20° C. The gas inlet tube reaches the bottom of the cylinder and ends with a porous diaphragm (diameter 3.5 cm.).

100 cc. of anhydrous n-heptane and 20 cc. of Δ2,2'-dicyclopentenyl are introduced into the reactor kept under nitrogen. A gaseous mixture of propylene and ethylene in the molar ratio of 2:1 is introduced through the gas inlet tube at the flow-rate of 200 normal liters/hour.

In a 100-cc. flask kept at −20° C., the catalyst is preformed under nitrogen, by reacting 4 millimols of vanadium tetrachloride and 10 millimols of aluminum trihexyl in 30 cc. of anhydrous n-heptane. The catalyst thus preformed is then siphoned into the reactor under nitrogen pressure.

The gaseous propylene-ethylene mixture is continuously fed and discharged with a flow-rate of 400 normal liters/hour.

After 5 minutes from the beginning of the reaction, the reaction is stopped by the addition of 20 cc. of methanol containing 0.1 g. of phenyl-beta naphthylamine. The product is purified in a separating funnel under nitrogen by repeated treatments with dilute hydrochloric acid and then with water and is coagulated in acetone.

After vacuum drying 5.3 g. of a solid product are obtained, which is amorphous by X-rays examination, has the appearance of a non-vulcanized elastomer and is completely soluble in boiling n-heptane. Infrared spectrographic examination shows that the ethylene/propylene molar ratio is about 1:1 and that double bonds are present (band at 6 microns).

100 parts by weight of the ethylene-propylene-Δ2,2'-dicyclopentenyl copolymer are mixed in a laboratory roll mixer with 1 part of phenylbetanaphthylamine, 2 parts of sulfur, 5 parts of zinc oxide, 2 parts of laurilic acid, 1 part of tetramethylthiuram disulphide and 0.5 part of mercaptobenzothiazole. The mix is vulcanized in a press for 60 minutes at 150° C.

A vulcanized lamina having the following characteristics is obtained:

Tensile strength, kg./cm.² _____ 85
Elongation at break, percent _____ 420
Modulus at 300%, kg./cm.² _____ 20

*Example 2*

The reaction apparatus is similar to that described in Example 1.

100 cc. of anhydrous n-heptane and 20 cc. of 2,2'-dicyclopentenyl are introduced into the reaction apparatus kept at −20° C.

The agitation is started and through the gas inlet tube, a gaseous mixture of propylene and ethylene in the molar ratio of 2:1 is introduced and circulated at the flow-rate of 200 N l./h.

In a 100-cc. flask, the catalyst is pre-formed at —20° C. under nitrogen atmosphere, by reacting 4 millimols of vanadium tetrachloride and 20 millimols of aluminum diethyl monochloride in 30 cc. of heptane. The catalyst thus preformed is siphoned into the reactor under nitrogen pressure.

The ethylene-propylene mixture is continuously circulated at the flow-rate of 400 normal liters/hour.

After 1 hour from the beginning of the reaction, the reaction is stopped by the addition of 20 cc. of methanol containing 0.1 g. of phenylbeta-naphthylamine. The product is purified and isolated as described in Example 1.

After vacuum drying 10.6 g. of a solid product are obtained, which is amorphous by X-rays examination, is completely soluble in boiling n-heptane and has the appearance of a non-vulcanized elastomer. Infrared spectrographic analysis shows that the ethylene-propylene molar ratio is about 1:1 and that double bonds are present (band at 6 microns).

The ethylene-propylene-Δ2,2'-dicyclopentenyl copolymer is vulcanized by using the mix and the modalities described in Example 1.

A vulcanized lamina having the following characteristics is thus obtained:

Tensile strength, kg./cm.$^2$ _____ 24.6
Elongation at break, percent _____ 340
Modulus at 300%, kg./cm.$^2$ _____ 16

*Example 3*

The reaction apparatus is similar to that described in Example 1.

100 cc. of anhydrous n-heptane and 20 cc. of Δ2,2'-dicyclopentenyl are introduced into the apparatus kept at —20° C.

The agitation is started and through the gas inlet tube, a gaseous mixture of propylene and ethylene in the molar ratio of 4:1 is introduced and circulated at the flow-rate of 200 normal liters/hour.

In a 100-cc. flask, the catalyst is preformed at —20° C. under nitrogen by reacting 2.8 millimols of vanadium triacetylacetonate and 14 millimols of aluminum diethyl monochloride in 30 cc. of anhydrous toluene. The catalyst thus pre-formed is kept at —20° C. for 5 minutes and is then siphoned into the reactor under nitrogen pressure.

The gaseous ethylene-propylene is continuously circulated at the flow-rate of 400 normal liters/hour.

After 25 minutes from the beginning of the reaction, the reaction is stopped by the addition of 200 cc. of methanol containing 0.1 g. of phenyl-beta naphthylamine. The product is purified and isolated as described in Example 1.

After vacuum drying 8.1 g. of a solid product are obtained, which is amorphous by X-rays examination, has the appearance of a non-vulcanized elastomer, and is completely soluble in boiling n-heptane. Infrared spectrographic analysis shows that the ethylene/propylene molar ratio is about 1:1 and that double bonds are present (band at 6 microns).

The ethylene-propylene Δ2,2'-dicyclopentenyl copolymer is vulcanized by using the mix and the modalities described in Example 1.

A vulcanized lamina having the following characteristics is thus obtained:

Tensile strength, kg./cm.$^2$ _____ 26.6
Elongation at break, percent _____ 470
Modulus at 300%, kg./cm.$^2$ _____ 11.4
Permanent set after breaking, percent _____ 6

If, in addition to the ingredients listed in Example 1, 50 parts by weight of HAF (high abrasion furnace) carbon black are also used and the vulcanization is carried out under the conditions of Example 1, a vulcanized lamina having the following characteristics is obtained:

Tensile strength, kg./cm.$^2$ _____ 160
Elongation at break, percent _____ 450
Modulas at 300%, kg./cm.$^2$ _____ 108
Permanent set after breaking, percent _____ 14

*Example 4*

The reaction apparatus is similar to that described in Example 1. 100 cc. of anhydrous n-heptane and 20 cc. of 1,4-bis(cyclopenten-2-yl)butane are introduced into the apparatus kept at —20° C.

Through the gas inlet tube a gaseous mixture of propylene and ethylene in the molar ratio 2:1 is introduced and circulated at the flow-rate of 200 normal liters/hour.

The catalyst is pre-formed in a 100 cc. flask, kept at —20° C. under nitrogen by reacting 4 millimols of vanadium tetrachloride and 20 millimols of aluminum diethylmonochloride in 30 cc. of anhydrous n-heptane. The thus pre-formed catalyst is siphoned into the reactor by means of nitrogen pressure.

The gaseous ethylene-propylene mixture is continuously introduced and circulated at the rate of 200 normal liters/hour. After 50 minutes from the beginning of the reaction, the reaction is stopped by adding 10 cc. of methanol containing 0.1 g. of phenyl-beta-naphthylamine. The product is purified and isolated as described in Example 1.

After vacuum drying 8 g. of a solid product are obtained, which is amorphous under X-rays examination, looks like a non-vulcanized elastomer and is completely soluble in boiling n-heptane. The infrared spectrographic examination shows the presence of double bonds (band at about 6 microns).

The ethylene-propylene molar ratio is about 1:1 and the intrinsic viscosity is 2.3.

*Example 5*

100 cc. of anhydrous n-heptane and 20 cc. of Δ-2,2'-dicyclopentenyl are introduced into the same reaction apparatus of Example 1, kept at —20° C.

A gaseous ethylene butene-1 mixture in the molar ratio 1:3 is introduced through the gas inlet tube and circulated at the rate of 200 N l./h. The catalyst is preformed in a 100 cc. flask by reacting at —20° C. under nitrogen atmosphere in 30 cc. of anhydrous n-heptane 4 millimols of vanadium tetrachloride and 20 millimols of aluminum diethylmonochloride.

The thus preformed catalyst is siphoned into the reactor by means of nitrogen pressure. The gaseous ethylene butene mixture is continuously introduced and discharged at the rate of 300 N l./h. 7 minutes after; in the beginning the reaction is stopped by adding 10 cc. of methanol containing 0.1 g. of phenyl-beta-naphthylamine. The product is purified and isolated as described in Example 1. After vacuum drying 8 g. of a solid product which is amorphous at the X-rays, looks like a non-vulcanized elastomer and is completely soluble in n-heptane are obtained. Infrared examination shows the presence of double bonds (6 microns band) of methylenic sequences of various length (zone at between 13 and 13.8 micron) and of methyl groups (band at 7.25 micron).

The product is vulcanized with the same mix and the same procedure of Example 1. A vulcanized lamina having following characteristics is obtained:

Tensile strength, kg./cm.$^2$ _____ 37
Elongation at break, percent _____ 530
Modulus at 300%, kg./cm.$^2$ _____ 13

*Example 6*

100 cc. of anhydrous n-heptane and 20 cc. of Δ2,2'-dicyclopentenyl are introduced into the same reaction apparatus described in Example 1, kept at —20° C.

Through the gas inlet tube a gaseous propylene-ethylene mixture in the molar ratio 2:1 is introduced and circulated at the rate of 200 N l./h. The catalyst is preformed in a 100 cc. flask at —20° C. and under nitrogen atmosphere by reacting in 30 cc. of anhydrous n-heptane 4 millimols of vanadium tetrachloride and 20 millimols of aluminum diethylmonohydride.

The thus preformed catalyst is siphoned into the reactor by means of nitrogen atmosphere. The propylene-ethylene mixture is continuously fed and discharged at the rate of 300 N l./h. 25 minutes after the beginning the reaction is stopped by adding 10 cc. of methanol containing 0.1 g. of phenyl-beta-naphthylamine.

The product is purified and isolated as described in Example 1. After vacuum drying 6 g. of solid product which is amorphous at the X-rays, looks like a non-vulcanized elastomer, and is completely soluble in boiling n-heptane are obtained.

Infrared examination shows the presence of double bonds (band at about 6 micron). The ethylene-propylene molar ratio is about 1:1.

What is claimed is:

1. High molecular weight, substantially linear, amorphous, unsaturated copolymers of one or more polycyclic hydrocarbon dienes having two isolated nuclei and containing one double bond in each of said nuclei, with one or more monomers selected from the group consisting of ethylene and aliphatic alpha-olefins having the general formula R—CH=CH$_2$, in which R is an alkyl group containing 1 to 6 carbon atoms, which copolymers consist of macromolecules containing unsaturations and consisting of monomeric units derived from each of the monomers employed.

2. Copolymers according to claim 1, substantially consisting of macromolecules containing units of one or more monomers selected from ethylene and aliphatic alpha-olefins having the general formula R—CH=CH$_2$, in which R is an alkyl group containing 1 to 6 carbon atoms, and of monomers selected from the group consisting of Δ2,2'-dicyclopentenyl, Δ2,2'-dicyclohexenyl, Δ3,3'-dicyclohexenyl, dicyclooctenyl, 2,2'-bis(cyclohexen-3-yl)-propane, 1,4-bis(cyclopenten-2-yl)butane, 1,5-bis(cyclopenten-2-yl) pentane.

3. Copolymers according to claim 1, substantially consisting of macromolecules containing monomeric units derived from ethylene, propylene, and Δ2,2'-dicyclopentenyl.

4. Copolymers according to claim 1, substantially consisting of macromolecules containing monomeric units derived from ethylene, butene-1 and Δ2,2'-dicyclopentenyl.

5. Copolymers according to claim 1, substantially consisting of macromolecules containing monomeric units derived from ethylene, propylene and 1,4 bis(cyclopenten-2-yl)butane.

6. A process for preparing the copolymers of claim 1, characterized in that at least one monomer selected from the group consisting of ethylene and aliphatic alpha-olefins having the general formula R—CH=CH$_2$ in which R is an alkyl radical containing 1 to 6 carbon atoms, is reacted with at least one polycyclic hydrocarbon diene having two isolated nuclei and containing one double bond in each of said nuclei in the presence of a catalyst consisting of the reaction product between:
  (a) vanadium compounds and
  (b) a compound selected from metallorganic aluminum compounds and aluminium hydrides wherein at least one of the catalyst forming components contains a halogen.

7. A process according to claim 6, characterized in that the catalyst is obtained from hydrocarbon-soluble vanadium compounds selected from the group consisting of vanadium halides and oxyhalides and vanadium compounds in which at least one of the metal valences is saturated by a heteroatom selected from the group consisting of oxygen and nitrogen, bound to an organic group.

8. A process according to claim 6, characterized in that the catalyst is obtained from hydrocarbon-insoluble vanadium organic salts selected from the group consisting of vanadium triacetate, vanadium tribenzoate and vanadium tristearate.

9. A process according to claim 6 characterized in that the polymerization is carried out at temperatures between −80° and +125° C.

10. A process according to claim 6, characterized in that the polymerization is carried out with the monomers in the liquid state, and in the absence of any extraneous inert solvent.

11. A process according to claim 6, characterized in that the polymerization is carried out in the presence of an inert solvent.

12. A process for preparing a copolymer of a polycyclic diene having isolated nuclei with ethylene and propylene according to claim 6, characterized in that the molar ratio of ethylene to propylene in the reacting liquid phase is lower than 1:4.

13. A process for preparing a copolymer of a polycyclic diene having isolated nuclei, with ethylene and butene-1 according to claim 6, characterized in that the ethylene to butene-1 molar ratio in the reacting liquid phase is lower than 1:20.

14. Elastomers obtained by vulcanization of the copolymers according to claim 1.

15. Shaped articles containing the elastomers according to claim 14.

No references cited.

JOSEPH L. SCHOFER, Primary Examiner.

E. J. SMITH, W. HOOVER, Assistant Examiners.